(12) United States Patent
McKinney et al.

(10) Patent No.: US 7,113,804 B2
(45) Date of Patent: Sep. 26, 2006

(54) COMMUNICATION DEVICE AND METHOD OF OPERATION THEREFORE

(75) Inventors: John McKinney, Plantation, FL (US); Branko L. Avanic, Miami, FL (US); Hiep T. Dang, Coconut Creek, FL (US); Joseph J. Medvid, Weston, FL (US); Wayne M. Phang, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 336 days.

(21) Appl. No.: 10/754,407

(22) Filed: Jan. 9, 2004

(65) Prior Publication Data

US 2005/0153731 A1 Jul. 14, 2005

(51) Int. Cl.
*H04M 1/00* (2006.01)

(52) U.S. Cl. .................. 455/522.1; 455/41.1; 455/501; 455/80

(58) Field of Classification Search ............. 455/426.1, 455/41.1, 24, 70, 436, 439, 450, 553.1, 80, 455/501

See application file for complete search history.

(56) References Cited

U.S. PATENT DOCUMENTS

| | | | |
|---|---|---|---|
| 5,400,399 A | 3/1995 | Umemoto et al. | |
| 6,522,895 B1 | 2/2003 | Montalvo | |
| 6,526,265 B1 | 2/2003 | Damgaard et al. | |
| 6,658,264 B1 | 12/2003 | Irvin | |
| 6,658,267 B1 | 12/2003 | Baranowski | |
| 6,708,028 B1* | 3/2004 | Byrne | 455/426.1 |
| 2004/0192202 A1* | 9/2004 | Novorita et al. | 455/24 |
| 2004/0203353 A1* | 10/2004 | Connor | 455/41.1 |
| 2005/0026568 A1* | 2/2005 | Hawker et al. | 455/70 |

* cited by examiner

*Primary Examiner*—Charles Appiah
*Assistant Examiner*—Phuoc Doan

(57) ABSTRACT

A communication device (105) includes a first communication block (205) for operation within a first communication network (150); and a second communication block (210) for operation within a second communication network (160). The communication device (105) further includes an audio control (245) for at least one microphone (250). The audio control (245) is coupled to the first communication block (205) for receiving a first audio input for operation of the first communication block (205) and is coupled to the second communication block (210) for receiving a second audio input for operation of the second communication block (210). A low noise ground (315) is isolated from a common ground (320) of the communication device (105) to facilitate the sharing of the at least one microphone (250) between the two communication blocks.

18 Claims, 7 Drawing Sheets

COMMUNICATION DEVICE AND METHOD OF OPERATION THEREFORE

BACKGROUND OF THE INVENTION

1. Field of the Invention

The present invention is generally related to communication devices and more particularly to an improved communication device operating within multiple communication systems.

2. Description of the Related Art

Communication devices operating within a single communication system are well known in the art. Such communication devices, for example, can include cellular telephones, wireless messaging devices, cordless telephones, two way radios, and the like. Recently, composite communication devices having the capability to operate within multiple communication systems are emerging in the marketplace. For example, one communication device can operate on both a cellular network and a two way radio network. Similarly, one communication device can operate on both a cordless telephone network and a two way radio network.

Cordless telephones typically are used in the home to allow the user to place and receive telephone calls at any point throughout the house. A cordless telephone system typically includes a portable cordless handset and a cordless base station connected to a telephone company phone system by telephone landlines. The cordless base station has an assigned landline telephone number that allows the user to place and receive calls using the cordless portable handset within a limited range of the cordless base station, such as in a home. However, due to their limited range, the cordless portable handset provides the user with relatively local radiotelephone communication. Further, a cordless telephone call is used generally for one to one communication via the landline communication system with limited capabilities for multi-device communication using conference calling options.

Radiotelephone communication outside the range of the cordless telephone system can be provided to a user via a two way radio system. A two way radio system typically includes a plurality of two way radio handsets communicating directly together on the same radio channel. When a user of a two way radio handset initiates a communication, the communication is transmitted to all the other two way radio handsets assigned to the same radio channel. In this manner, multiple handsets can communicate directly to each other.

Recently, some cordless telephones have been developed with handset to handset capability. These units do not provide group talk, but instead provide limited telephone inter-connect and one to one, full duplex radio capability.

Further, some new communication devices combine the mobility of a cordless telephone system with the immediacy of a two way radio system. Such combined devices provide accessibility to outside callers while staying in immediate contact with internal operations. In two-way radio mode, these devices provide instant communication with others utilizing two way radios on the same radio channel at the push of a button. In cordless telephone mode, these devices have similar functionality to standard landline telephones.

BRIEF DESCRIPTION OF THE DRAWINGS

The accompanying figures, where like reference numerals refer to identical or functionally similar elements throughout the separate views and which together with the detailed description below, are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Figure 1:
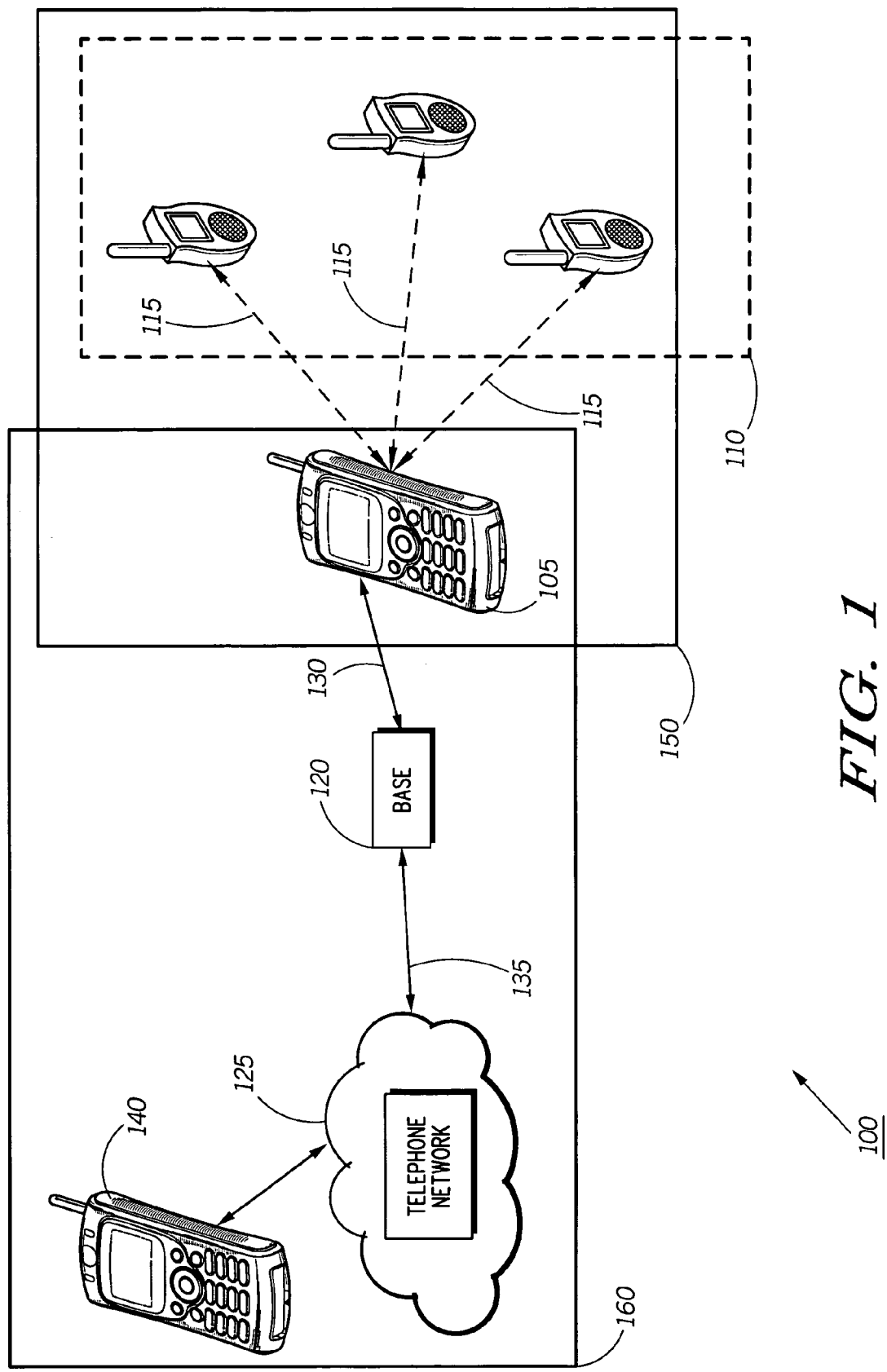
FIG. 1 is a block diagram of a system having devices which operate within more than one communication network.

FIG. 1 is a block diagram of a system 100 having one or more communication devices which operate within more than one communication network. A communication device 105 within the system 100 has the capability to communicate within more than one communication network such as a first communication network 150 and a second communication network 160. It will be appreciated by those of ordinary skill in the art that each of the first communication network 150 and the second communication network 160 can be a cellular telephone network, a cordless telephone network, a wireless local area network, a two way radio network and the like.

For example, as illustrated, when the first communication network 150 is a two way radio network, the communication device 105 can communicate with a plurality of conventional two way radio handsets 110 using conventional two way radio channels 115. The two way radio channels, for example, can be within the UHF (ultra high frequency) range. The communication device 105, for example, can monitor the two way radio channels 115 for channel activity. (i.e. a user can listen to others transmitting within the two way radio channels 115) The communication device 105 further can transmit to the plurality of two way radio handsets 110 over the two way radio channels 115. (i.e. a user can push a talk button and speak into a microphone of the communication device)

Further, as illustrated, when the second communication network 160 is a cordless telephone network, the communication device 105 has capability to communicate with and place radiotelephone calls via a cordless base station 120, which provides private telephone line interconnection to a conventional telephone network 125. As is well known in the art, the cordless base station 120 and the communication device 105 together provide the limited range radio service conventionally known as cordless telephone service. The cordless base station 120 is designed to provide telephone interconnect to the user's landline telephone line (i.e. home or office telephone line) when the user has the communication device 105 within the radio range of the cordless base station 120. Such cordless service conventionally utilizes radio frequency channels in the VHF (very high frequency) or UHF (ultra high frequency) radio frequency bands. Recently, cordless telephone systems are further using the GHZ (Gigahertz) frequency bands. For example, the communication device 105 can communicate with the cordless base station 120 on a 2.4 GHz frequency band. When a cordless telephone call is active, a telephone link 135 is established between the cordless base station 120 and the telephone network 125; and a communication link 130 is established between the cordless base station 120 and the communication device 105. In this manner, the user of the communication device 105 can communicate via the cordless base station 120 and the telephone network 125 to another device 140.

Figure 2:
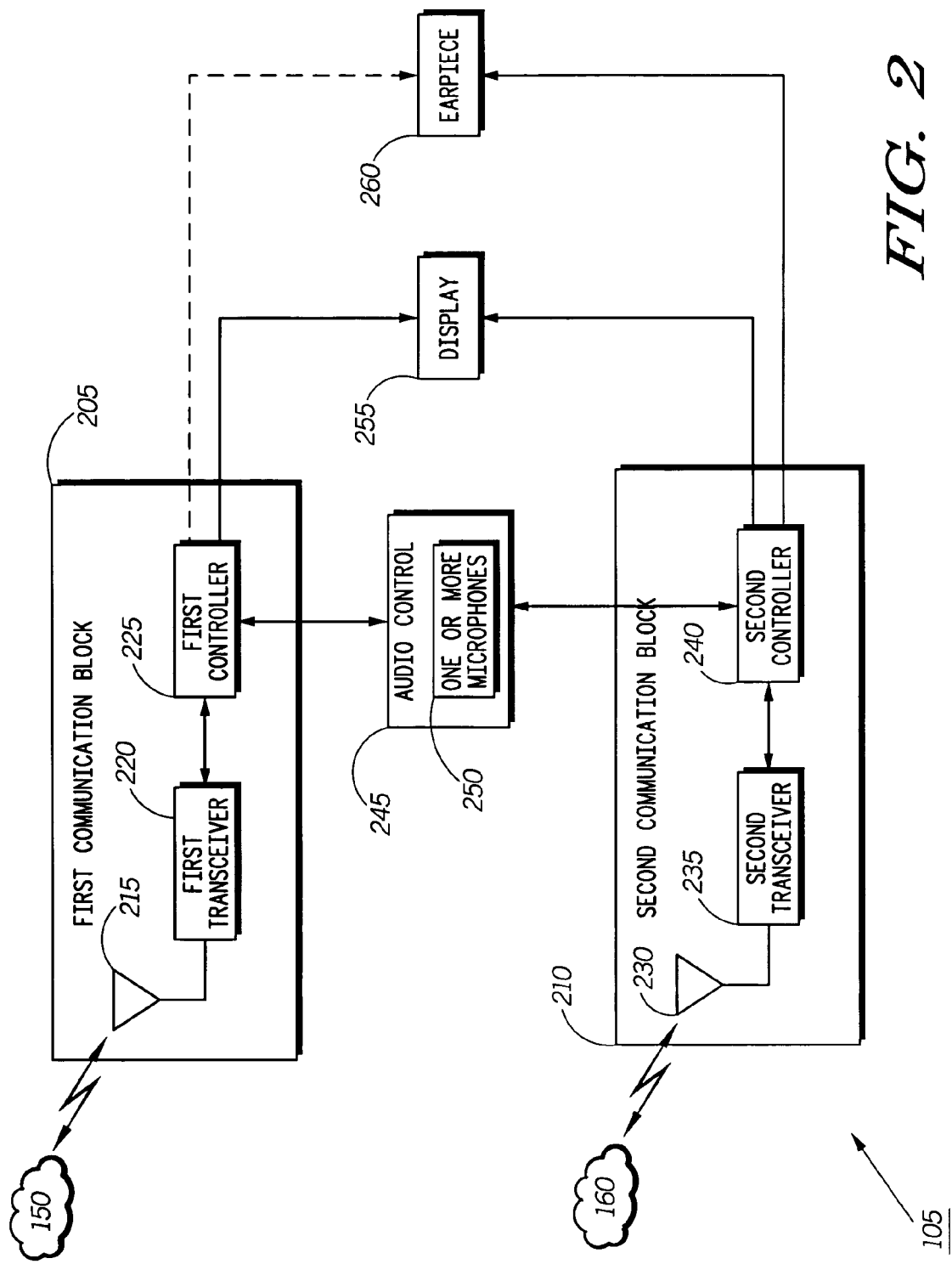
FIG. 2 is a block diagram of a device for operation within more than one communication networks for use within the system of FIG. 1.

FIG. 2 is a block diagram of a communication device 105 for operation within more than one communication networks such as for use within the system 100 of FIG. 1. As illustrated, the communication device 105 includes a first communication block 205 and a second communication block 210. Each of the first communication block 205 and the second communication block 210 can be, for example, electronics for operation of a cordless telephone, a two way radio, a cellular telephone, a wireless messaging device, and the like. Such communications within the first communication block 205 and the second communication block 210 are well known in the art and thus presented in generalities for simplicity purposes herein. The communication device 105 further includes an audio control 245, a display 255, and an earpiece 260, which each can be shared between the first communication block 205 and the second communication block 210 as required.

The first communication block 205 preferably includes an antenna 215 and associated circuitry for communicating within the first communication network 150. For example, when the first communication network 150 is a cordless telephone network, the antenna 215 can transmit and receive cordless calls over the communication link 130 (see FIG. 1) established between the cordless base station 120 (see FIG. 1) and the communication device 105. The antenna 215 is operatively coupled to a first transceiver 220. Using the current example, the first transceiver 220 can be a conventional cordless telephone transceiver. The first transceiver 220 is operatively coupled to a first controller 225 which includes functional circuits and software for operating the first communication block 205. The first controller 225, for example, can include a microprocessor, a memory, and the like, as is well known in the art. The first controller 225 is adapted to perform various services associated with the first communication block 205.

The second communication block 210 preferably includes a second antenna 230 and associated circuitry to transmit and receive signals within the second communication network 160. For example, when the second communication network 160 is a two way radio network, the second antenna 230 communicates on one or more two way radio channels 115 (see FIG. 1) for communication with one or more two way radio handsets 110. The second antenna 230 is operatively coupled to a second transceiver 235, which, for example, can be a conventional two way radio transceiver in the current example. The second transceiver 235 is operatively coupled to a second controller 240 which can include a microprocessor, a memory, and the like, as is well known in the art. The second controller 240 is adapted to perform various services associated with both the second communication block 210.

An earpiece 260, in one embodiment, is coupled to the second controller 240 of the second communication block 210 and optionally can be coupled to the first controller 225 of the first communication block 205 for outputting audio communications for the user to hear. It will be appreciated by those of ordinary skill in the art that the earpiece 260 can be replaced with a speaker (not shown) or optionally enhanced with a speaker and associated speaker circuitry for outputting audio communications for the user as well. The speaker and/or the earpiece 260 receive electrical signals from the first controller 225 and/or the second controller 240 and convert them into sound.

Preferably, the first controller 225 and the second controller 240 are further operatively coupled to the display 255 using standard input and output drivers as are known in the art. The display 255 provides visual information by displaying data such as one or more communication messages, phone numbers, caller identifications, graphic images, text entries, and the like. The display 255 further can be used to display indication of the status of various electronics within the communication device 105. It will be appreciated by those of ordinary skill in the art that the display 255 can be a liquid crystal display, a cathode ray tube display, one or more organic light emitting diodes, one or more LEDs, a plasma display, or an equivalent.

In accordance with the present invention, the audio control 245 is coupled to the first controller 225 and further coupled to the second controller 240 for receiving audio inputs from a user of the communication device 105. Contained within the audio control 245 are one or more microphones 250 which each operate to change the sound waves from a user's voice into electrical signals that are sent to appropriate communication block. For example, when the first communication block 205 is a cordless telephone, during standard cordless telephone operation, an external microphone is utilized while during speaker telephone cordless operation, an internal microphone is utilized. The audio control 245 provides the ability for the communication device 105 to share a single microphone and associated circuitry between the first communication block 205 and the second communication block 210. Instead of having to have an additional microphone for each operating mode, a shared microphone is utilized.

Figure 3:
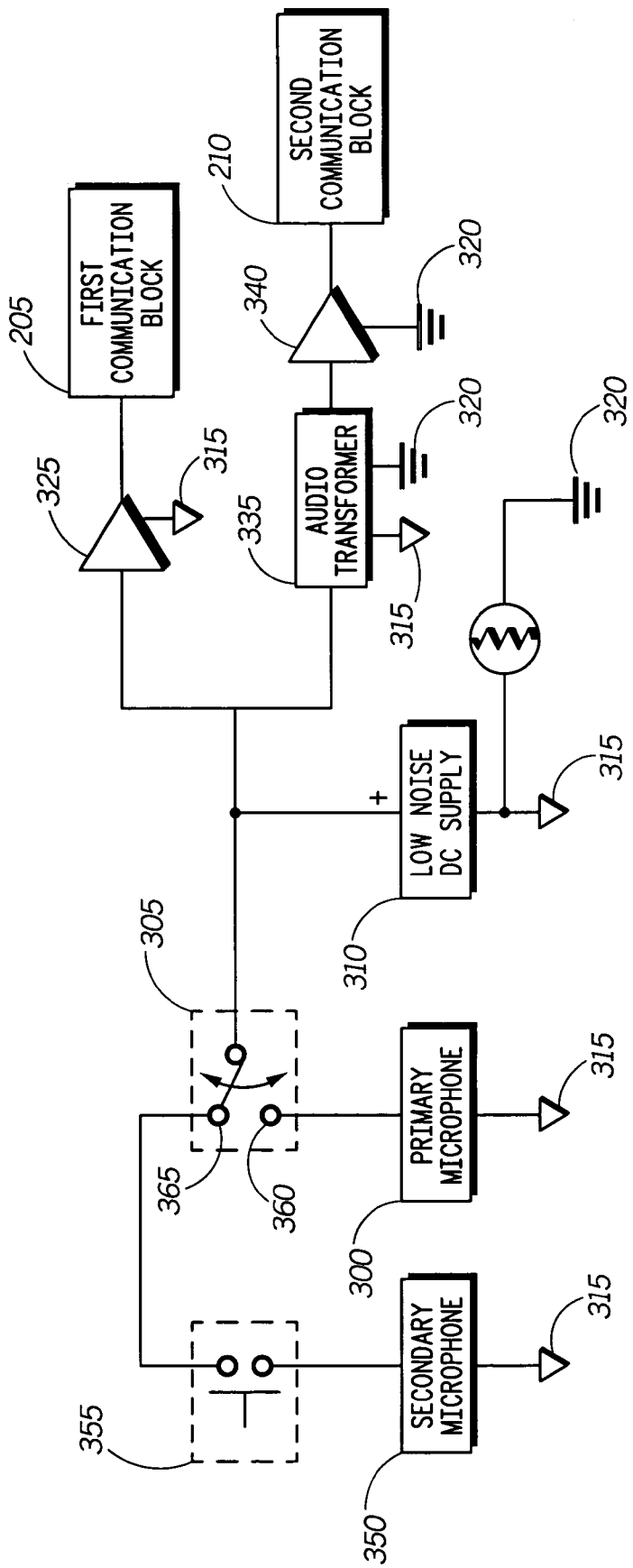
FIG. 3 is a block diagram illustrating an audio control for use within the device of FIG. 2.

FIG. 3 is a block diagram illustrating one embodiment of the audio control 245 for use within the communication device 105 of FIG. 2. Specifically, FIG. 3 illustrates one embodiment for utilization of one or more shared microphones. As illustrated in FIG. 3, a low noise DC (direct current) supply 310 is used. The low noise DC supply 310 provides a clean low noise ground 315 as opposed to a standard noisy ground as indicated by the common ground 320. Note that the ground symbols in FIG. 3 that are shown with a triangle and labeled 315 are "low noise" grounds and that one of these is tied directly to the low noise DC supply 310. The common grounds in the block diagram of FIG. 3 represented by 3 (three) parallel horizontal lines and labeled 320 are not considered as 'clean' as the low-noise ground. Containing the noisier grounds thru the means to be described herein provide enhanced performance using the shared microphone within the device 200.

A primary microphone 300 is coupled to both the first communication block 205 and the second communication block 210 via a switch 305. The primary microphone 300, for example, can be a microphone internal to the device. The switch 305, for example, can be a push to talk switch, a slide switch, or any other mechanical equivalent. When the switch 305 is in a first position 360, the low noise DC supply 310 provides low noise power to the primary microphone 300. Further, the primary microphone 300 becomes available for both the first communication block 205 and the second communication block 210. Coupled between the switch 305 and the first communication block 205 is a first audio amplifier 325. The first audio amplifier 325 is grounded via the low noise ground 315.

The second communication block 210 is coupled to the switch 305 via an audio transformer 335 and a second audio amplifier 340. The second audio amplifier 340 is grounded via the common ground 320. The audio transformer 335 couples together the purposely isolated grounds of the first communication block 205 circuitry with that of the second communication block 210 circuitry. The ground isolation eliminates ground loops between the first communication block 205 circuitry and the second communication block 210 circuitry.

When the switch 305 is in a second position 365, the primary microphone 300 is no longer available to the first communication block 205 and/or the second communication block 210. Further, a path is created for coupling one or more secondary microphones to the low noise DC supply 310, the first communication block 205, and the second communication block 210. The one or more secondary microphones, for example, can include an external microphone and/or an external accessory. Although one secondary microphone is illustrated in FIG. 3, it will be appreciated by those of ordinary skill in the art that the present invention can be implemented using any number of internal and/or external microphones and/or accessories.

When the switch 305 is in the second position 365, and a secondary switch 355 is activated, the low noise DC supply 310 provides low noise power to the secondary microphone 350. The secondary switch 355, for example, can be a push to talk switch, a slide switch, or any other mechanical equivalent. Further, the secondary microphone 350 becomes available for both the first communication block 205 and the second communication block 210 as described previously herein in relation to the primary microphone 300.

The mechanical operation of the electronics of FIG. 3 facilitates the shared use of multiple microphones and accessories within a communication device having multiple communication capabilities. The operation provides a mechanical means to ensure that only one microphone or accessory is utilized at any given moment in time. It further provides an isolated ground structure to enhance such capabilities.

Although not illustrated in FIG. 3, it will be appreciated by those of ordinary skill in the art that indicators on the display 255 of the communication device 105 can provide notification of the status of each of the microphones and accessories utilized by the communication device 105. The operation herein can thus be implemented with complete mechanical structure, not requiring any additional processor control logic.

Figure 4:
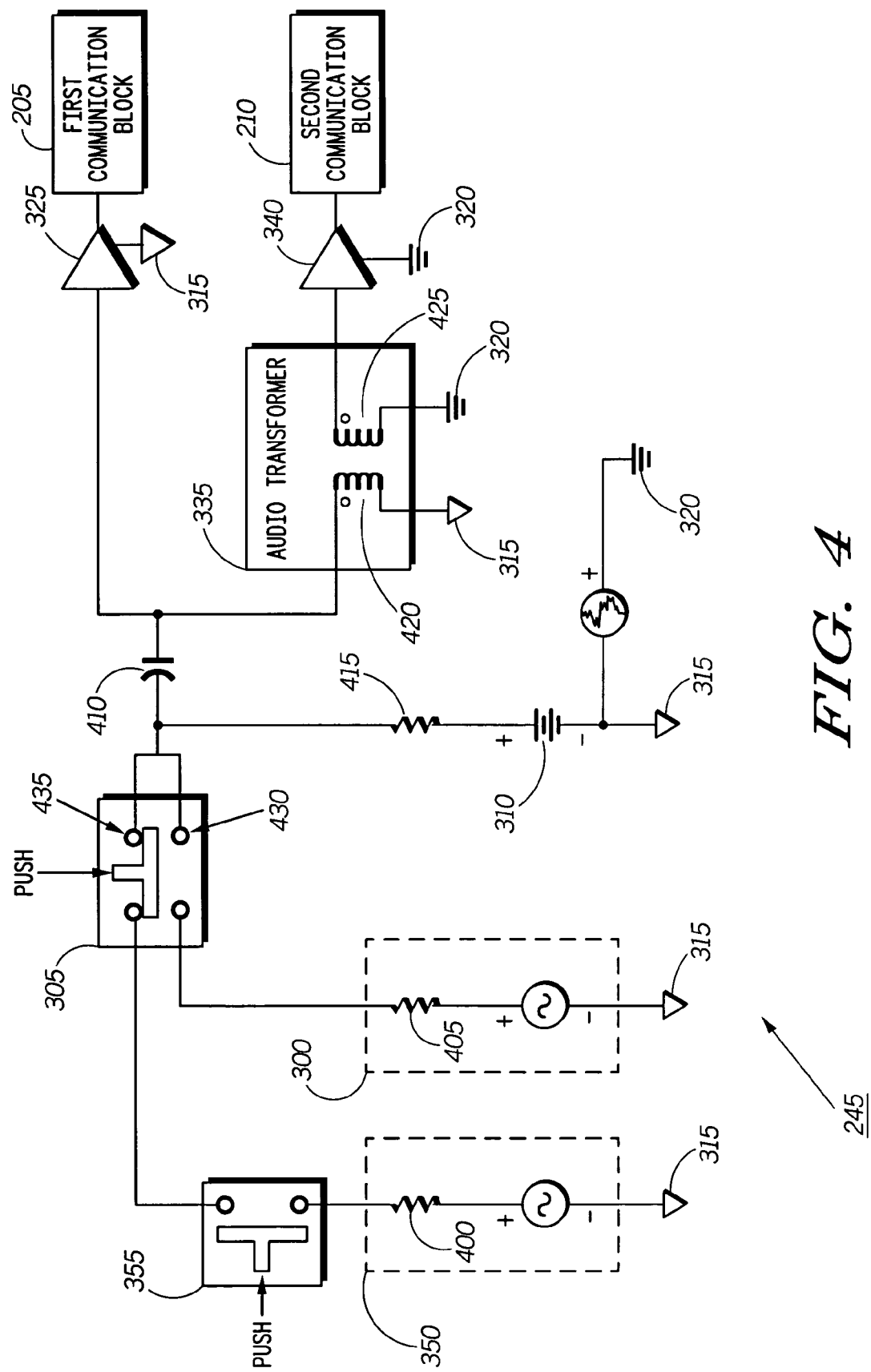
FIGS. 4 and 5 are schematic representations of various embodiments of the audio control of FIG. 3.

FIG. 4 is a schematic representation of one embodiment of the audio control 245 of FIG. 3. As illustrated in FIG. 4, the audio control circuitry includes the low noise DC supply 310 and the audio transformer 335 for providing means to couple the low noise ground 315 to the common ground 320 of the communication device 105 as described previously herein for FIG. 3.

As illustrated in FIG. 4, the low noise DC supply 310, the primary microphone 300, the one or more secondary microphones 350, the first audio amplifier 325, and a primary winding 420 of the audio transformer 335 are all referenced to the low noise ground 315. The second audio amplifier 340 and a secondary winding 425 of the audio transformer 335 are referenced to the common ground 320. Providing separate grounds for the microphone audio amplifiers (325,340) eliminates ground loops, thereby providing isolation between the first communication block 205 and the second communication block 210 while coupling equivalent signals from the primary microphone 300 or one or more secondary microphones 350. It will be appreciated that by using the same DC supply with approximately the same microphone resistance provides approximately equivalent audio amplitude output levels output independent of which of the microphones is active.

The audio transformer 335 comprises the primary winding 420 coupled to the low noise ground 315 and the secondary winding 425 coupled to the common ground 320. The primary winding 420 and the secondary winding 425 are electromechanically coupled together, thereby isolating the low noise ground 315 from the common ground 320. The audio transformer 335 eliminates ground loop feedback which can severely degrade the ability to share the primary and one or more secondary microphones for both the first communication and the second communication operation.

When the switch 305 is set to a first switch position 430 (for example, pressing a push to talk button to a closed position), the low noise DC supply 310 is fed through a supply resistor 415 to a primary microphone resistor 405 of the primary microphone 300, thus activating the primary microphone 300.

When the switch 305 is set to a second switch position 435 (for example, a push to talk button is in an open position), the low noise DC supply 310 becomes available to one or more secondary microphones 350 when a secondary switch 355 is activated. (for example, pressing a second push to talk button to a closed position) via a secondary resistor 400. When the switch 305 is set to the first switch position 430 and the secondary switch 355 is activated, the low noise DC supply 310 is fed through the supply resistor 415 to the primary microphone resistor 405 of the primary microphone 300, thus activating the primary microphone 300. In other words, activation of the primary microphone 300 is prioritized over activation of one or more secondary microphones 350. In the manner herein described, the low noise DC supply 310 is able to serve as the supply for both the primary microphone 300 and one or more secondary microphones 350.

Figure 5:
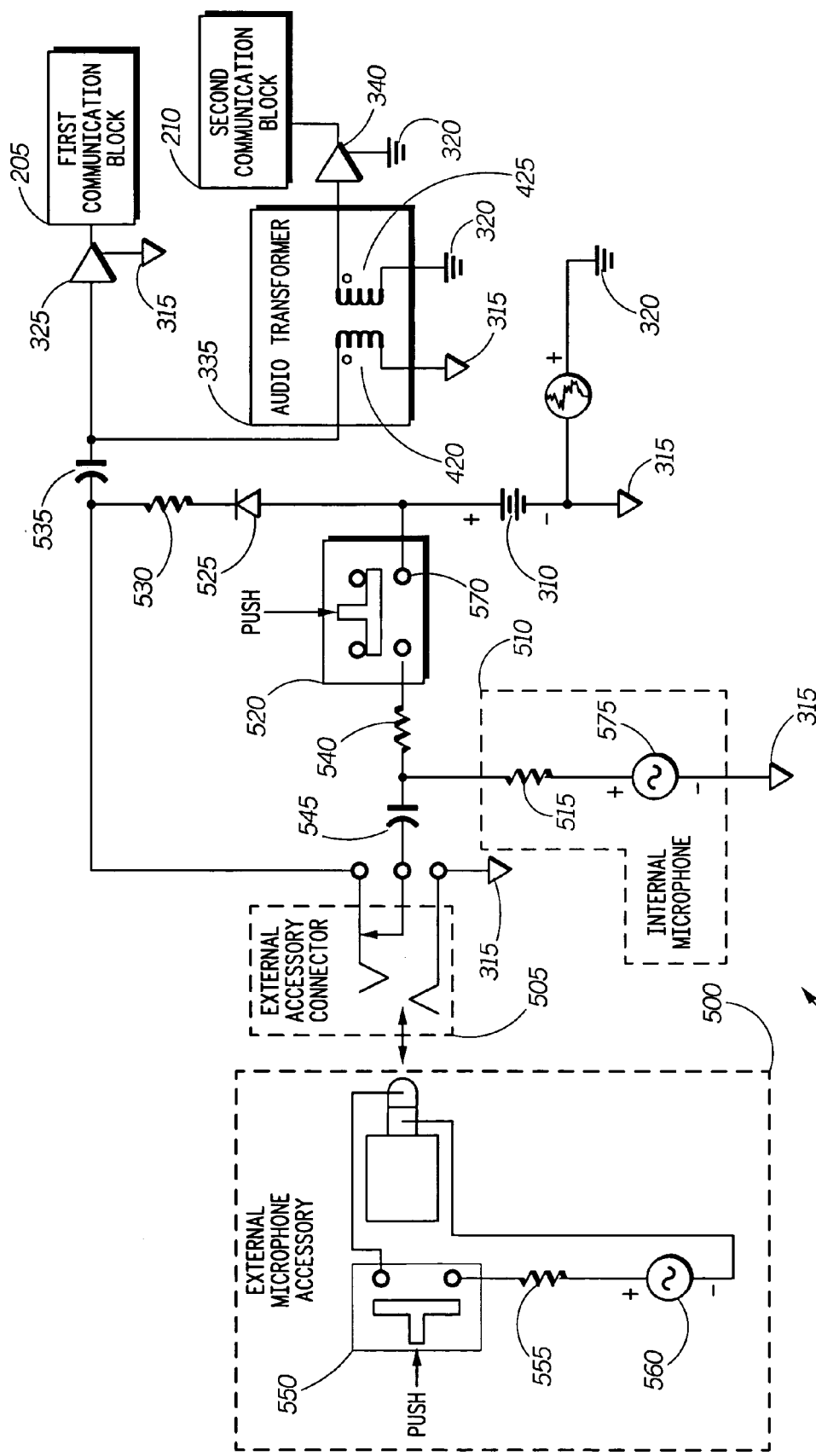

FIG. 5 is a schematic representation of an alternate embodiment of the audio control 245 of FIG. 3. Specifically, FIG. 5 illustrates an audio control circuit using an internal microphone 510 and an external microphone accessory 500.

Figure 7:
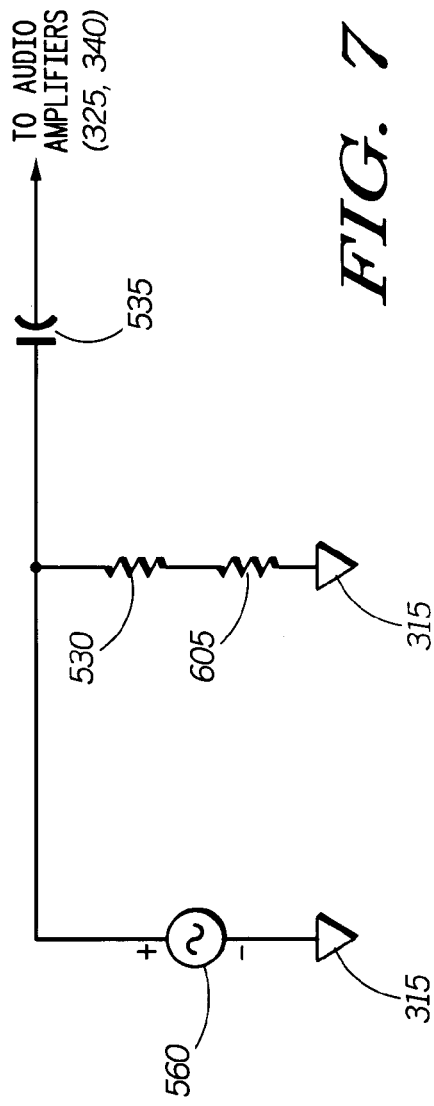

As illustrated in FIG. 7, the audio control circuitry includes the low noise DC supply 310 and the audio transformer 335 for providing means to couple the low noise ground 315 to the common ground 320 of the rest of the communication device 105 as described previously herein for FIG. 3.

The low noise DC supply 310, the internal microphone 510, the external microphone accessory 500, the first audio amplifier 325, and the primary winding 420 of the audio transformer 335 are all referenced to the low noise ground 315. The second audio amplifier 340 and the secondary winding 425 of the audio transformer 335 are referenced to the common ground 320. Providing separate grounds for the microphone audio amplifiers (325,340) eliminates ground loops, thereby providing isolation between the first communication block 205 and the second communication block 210 to either the internal microphone 510 or the external microphone accessory 500.

When a microphone switch 520 is set to a microphone active position 570 (for example, pressing a push to talk button to a closed position), the low noise DC supply 310 is fed through a series resistor 540 to an internal microphone resistor 515 of the internal microphone 510, thus activating the internal microphone circuit 575. Activating the microphone switch 520 further provides a path to couple audio between the internal microphone 510 and the microphone audio amplifiers 325,340.

The external microphone accessory 500 can be mechanically coupled to the external accessory connector 505 by a user plugging in the external microphone accessory 500, for example. This action mechanically disengages the first capacitor 545 from the second capacitor 535 thereby eliminating the potential audio path between the internal microphone 510 and the microphone audio amplifiers 325,340. The external microphone accessory 500 preferably includes an external microphone switch 550 for activating an external microphone 560 via an external microphone resistor 555. When the microphone switch 550 is actuated, the external microphone accessory 500 is coupled to the external accessory connector 505, and the external microphone 560 is activated as current flows from the low noise DC supply 310 through a diode 525 and a resistor 530 through the external accessory connector 505 through the external microphone switch 550 and through the external microphone resistor 555. Operation of both the internal microphone 510 and the external microphone 560 for use by both the first communication block 205 and the second communication block 210 is accomplished using the same low noise DC supply 310.

Figure 6:
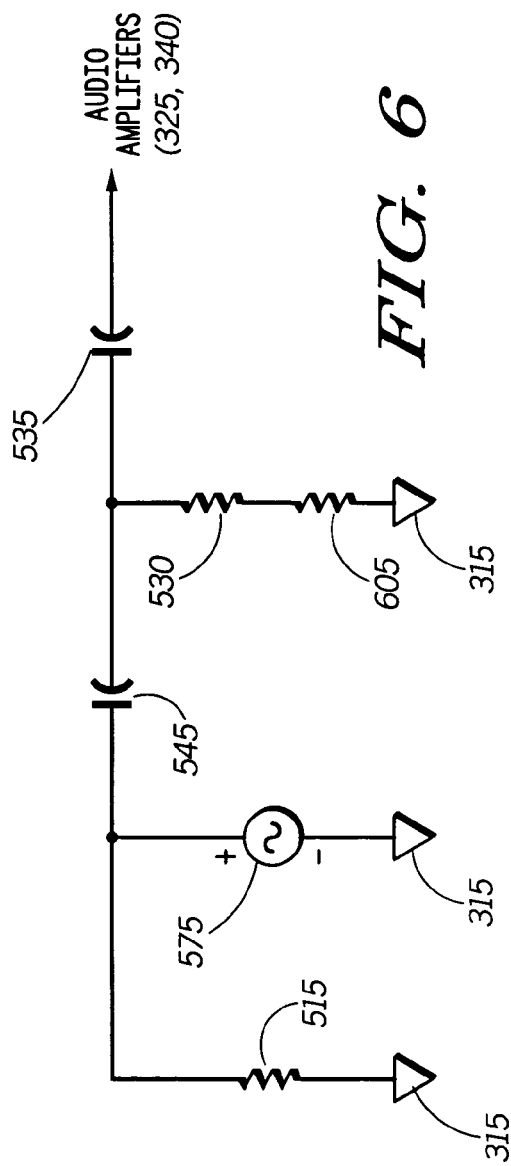
FIGS. 6 and 7 are various embodiments of schematic representations for alternate current equivalents of the operation of the audio control of FIG. 5.

FIG. 6 is an AC equivalent representation for the case of the internal microphone 510 being activated. (i.e., microphone switch 520 is set to a microphone active position 570) As illustrated in FIG. 6, the internal microphone resistor 515 is AC equivalently coupled in parallel to the internal microphone circuit 575, each being grounded to the low noise ground 315. The positive side of each of the internal microphone resistor 515 and the internal microphone circuit 575 are coupled to one side of the first capacitor 545. The opposing side of the first capacitor 545 is grounded through the resistor 530 and a diode resistance 605 (i.e. the equivalent resistance of the diode 525 of FIG. 5) to the low noise ground 315. The first capacitor 545 is also coupled to the microphone amplifiers (335,340) via the second capacitor 535. Given large capacitors 545 and 535, and the internal microphone resistor 515 being approximately equal to the resistor 530, the equivalent AC load resistance that the internal microphone circuit 575 will drive is represented by the following:

$$R\text{total} = R\text{internal} \| (RD1+R) \sim R\text{internal}$$

Where:
Rtotal is the resistance the internal microphone circuit 575 can drive
Rinternal is the resistance of the internal microphone resistor 515
RD1 is the diode resistance 605
R is the resistance of the resistor 530

Since there is no DC current flow across the diode 525 when the internal microphone 510 is activated, the diode resistance 605 is quite large relative to the resistance of the internal microphone resistor 515 and the resistance of the resistor 530. Therefore, Rtotal for this condition is approximately equal to the resistance of the internal microphone resistor 515. This AC representation results in a high-pass filter when we account for the capacitors 545 and the 535. The high-pass frequency response attenuates the very lowest of frequencies and passes the standard audio pass band (see FIG. 8).

FIG. 7 is an AC equivalent representation for the case of the one or more secondary microphones 560 being activated (i.e., the external microphone switch 550 is in the closed position); and the internal microphone 520 is non-activated (i.e. the switch 520 is in the open position). For example, an accessory is plugged into the external accessory connector 505 or a secondary microphone is connected to the circuitry, and the external microphone switch 550 is activated.

As illustrated in FIG. 7, the external microphone 560 is coupled in parallel to a series resistance consisting of the resistor 530 and the diode resistance 605. Each are grounded using the low noise ground 315. The positive side of the external microphone 560 is coupled via the capacitor 535 to the microphone amplifiers 325,340.

The following now holds true under this condition (AC equivalent):

$$R\text{total} = (RD1+R) \sim R$$

Since there is adequate DC current flow across the diode 525 when the external microphone 560 is activated, its resistance RD1 (i.e. the diode resistance 605) is quite small relative to the resistance of the resistor 530. Therefore, Rtotal for this condition is approximately equal to the resistance of the resistor 530.

This now leads to the case where the secondary microphone 560 is active. In the case of the secondary microphone 560 being active, only the capacitor 535 is in the circuit to pass the transmit microphone audio to either of the microphone audio amplifiers 325,340. Once again the entire audio frequency pass band is fed to the microphone audio amplifiers 325,340

Figure 8:
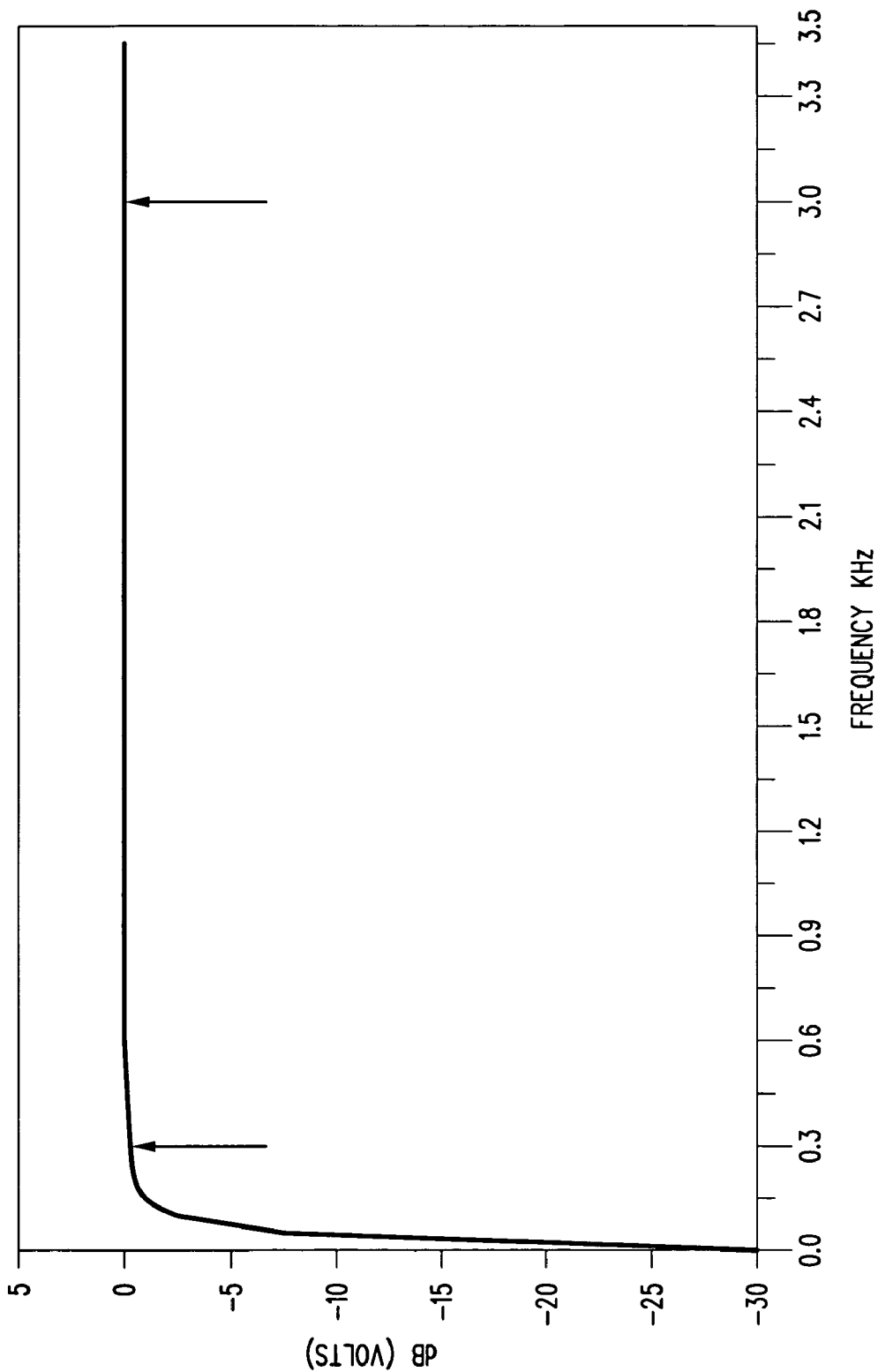
FIG. 8 illustrates one embodiment of the audio response of the audio controls of FIGS. 4 and 5.

FIG. 8 illustrates one embodiment of the audio frequency response of the circuits of FIGS. 4 and 5. Specifically, FIG. 8 illustrates a typical audio frequency response for the cases where there are equal microphone audio amplitudes and flat audio responses from <300 Hz to >3000 Hz for the two microphones.

The present invention as described herein allows for the simultaneous noise-reduced dual transceiver operation without the need for an additional accessory jack or an additional microphone and in so doing eliminates the drawbacks of microphone audio disparity as well as providing cost and space savings. In addition, this architecture has no dependency on intelligent logic to control the switched paths in this implementation. Conditions are instead affected by the mechanical insertion of an accessory plug or the press of a switch.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A communication device comprising:
   a first communication block for operation within a first communication network;
   a second communication block for operation within a second communication network;
   an audio control including one or more microphones, wherein the audio control is coupled to the first communication block for receiving a first audio input for operation of the first communication block, and further wherein the audio control is coupled to the second communication block for receiving a second audio input for operation of the second communication block, wherein the audio control further comprises:
   a low noise direct current supply for providing a low noise ground, wherein the low noise ground is isolated from a common ground; and
   an audio transformer, wherein the audio transformer is adapted to couple together the low noise ground and the common ground.

2. The communication device as defined in claim 1, wherein the audio control further comprises:
   a first audio amplifier coupled to the first communication block, wherein the first audio amplifier is grounded via the low noise ground; and
   a second audio amplifier coupled to the second communication block, wherein the second audio amplifier is grounded via the common ground.

3. The communication device as defined in claim 2, wherein the one or more microphones comprises a primary microphone, wherein the primary microphone is coupled to the first communication block through the first audio amplifier via a switch, and further wherein the primary microphone is coupled to the second communication block via the second audio amplifier via the switch and the audio transformer.

4. The communication device as defined in claim 3, wherein the switch includes a first position and a second position, wherein when the switch is in the first position, the low noise DC supply provides a low noise power to the primary microphone, and further wherein the primary microphone becomes available to both the first communication block and the second communication block.

5. The communication device as defined in claim 4, wherein the one or more microphones further comprise one or more secondary microphones, wherein when the switch is in a second position, the primary microphone is not available to the first communication block and the second communication block, and further wherein a path is created for coupling one or more secondary microphones to the low noise DC supply, the first communication block, and the second communication block.

6. The communication device as defined in claim 5, wherein the audio control further comprises a secondary switch, and further wherein when the switch is in the second position, and a secondary switch is activated, the low noise DC supply provides low noise power to the one or more secondary microphones, and further wherein the one or more secondary microphones become available for both the first communication block and the second communication block.

7. A communication device comprising:
   a first communication block for operation within a first communication network;
   a second communication block for operation within a second communication network; an
   an audio control including one or more microphones, wherein the audio control is coupled to the first communication block for receiving a first audio input for operation of the first communication block, and further wherein the audio control is coupled to the second communication block for receiving a second audio input for operation of the second communication block, wherein the one or more microphones include a primary microphone and one or more secondary microphones, and wherein the audio control comprises:
   a first audio amplifier coupled to the first communication block;
   a second audio amplifier coupled to the second communication block;
   a low noise DC supply having a low noise ground; and
   an audio transformer including a primary winding electromechanically coupled to a secondary winding, wherein the low noise DC supply, the primary microphone, the one or more secondary microphones, the first audio amplifier, and the primary winding of the audio transformer are all referenced to the low noise ground.

8. The communication device as defined in claim 7, wherein the second audio amplifier and the secondary winding of the audio transformer are referenced to the common ground.

9. The communication device as defined in claim 8, wherein the audio control further comprises:
   a switch having a first switch position and a second switch position, wherein the low noise DC supply is fed through a supply resistor to a primary microphone resistor of the primary microphone, thus activating the primary microphone when the switch is in the first switch position.

10. The communication device as defined in claim 9, wherein the audio control further comprises:
    a secondary switch, wherein the low noise DC supply becomes available to the one or more secondary microphones when a secondary switch is activated and the switch is in the second switch position, wherein the one or more secondary microphones are further available to the first communication block and the second communication block.

11. The communication device as defined in claim 10, wherein when the switch is set to the first switch position and the secondary switch is activated, the low noise DC supply is fed through the supply resistor to the primary microphone resistor of the primary microphone, thus activating the primary microphone, wherein the primary microphone is available to the first communication block and the second communication block.

12. A communication comprising:
   a first communication block for operation within a first communication network;
   a second communication block for operation within a second communication network;
   an audio control including one or more microphones, wherein the audio control is coupled to the first communication block for receiving a first audio input for operation of the first communication block, and further wherein the audio control is coupled to the second communication block for receiving a second audio input for operation of the second communication block, wherein the one or more microphones include an internal microphone and an external microphone accessory, and wherein the audio control comprises:
   a first audio amplifier coupled to the first communication block;
   a second audio amplifier coupled to the second communication block;
   a low noise DC supply having a low noise ground; and
   an audio transformer including a primary winding electromechanically coupled to a secondary winding,
   wherein the low noise DC supply, the internal microphone, the external microphone accessory, the first audio amplifier, and the primary winding of the audio transformer are all referenced to the low noise ground.

13. The communication device as defined in claim 12, wherein the second audio amplifier and the secondary winding of the audio transformer are referenced to the common ground.

14. The communication device as defined in claim 13, wherein the audio control further comprises:
   a microphone switch, wherein when the microphone switch is activated, the low noise DC supply is fed through a series resistor to an internal microphone resistor of the internal microphone, thus activating the internal microphone.

15. The communication device as defined in claim 14, wherein activating the microphone switch further provides a path to couple audio between the internal microphone and the first audio amplifier and the second audio amplifier.

16. The communication device as defined in claim 15, further comprising:
   an external accessory connector, wherein the external microphone accessory is mechanically coupled to the external accessory connector, and in response the first capacitor is disengaged from the second capacitor, thereby eliminating a potential audio path between the internal microphone and the microphone audio amplifiers.

17. The communication device as defined in claim 16, wherein the external microphone accessory includes an external microphone switch for activating an external microphone via an external microphone resistor.

18. A method for audio control operation within a communication device, the method comprising the steps of:
   coupling an audio control through a first audio amplifier to a first communication block;
   coupling the audio control through a second audio amplifier to a second communication block;
   generating a low noise ground using a low noise direct current supply;
   isolating the low noise ground from a common ground;
   electromagnetically coupling the low noise ground and the common ground using an audio transformer having a primary winding and a secondary winding;
   referencing at least one microphone, the first audio amplifier, and the primary winding of the audio transformer to the low noise ground;
   referencing the second audio amplifier and the secondary winding of the audio transformer to the common ground;
   activating the at least one microphone;
   receiving a first audio input for operation of a first communication block;
   operating the first communication block using the at least one microphone;
   receiving a second audio input for operation of a second communication block; and
   operating the second communication block using the at least one microphone.

* * * * *